(12) United States Patent
Bennett et al.

(10) Patent No.: US 7,832,525 B2
(45) Date of Patent: Nov. 16, 2010

(54) ACCESS PLATFORM FOR FLATBEDS

(75) Inventors: Ronald W. Bennett, Florence, SC (US); Ellie H. MacDonald, Timmonsville, SC (US); James A. Ackerman, Mullins, SC (US)

(73) Assignee: Aluminum Ladder Company, Florence, SC (US)

( * ) Notice: Subject to any disclaimer, the term of this patent is extended or adjusted under 35 U.S.C. 154(b) by 1134 days.

(21) Appl. No.: 11/295,127

(22) Filed: Dec. 5, 2005

(65) Prior Publication Data

US 2007/0125600 A1    Jun. 7, 2007

(51) Int. Cl.
*E04G 3/00* (2006.01)
(52) U.S. Cl. ......................................................... 182/36
(58) Field of Classification Search .................. 182/116, 182/130, 131, 36
See application file for complete search history.

(56) References Cited

U.S. PATENT DOCUMENTS

| | | | | |
|---|---|---|---|---|
| 4,367,865 A | * | 1/1983 | Blair et al. ..................... 266/44 |
| 4,679,657 A | * | 7/1987 | Bennett et al. ............... 182/113 |
| 4,787,111 A | * | 11/1988 | Pacek et al. ................... 14/71.1 |
| 5,121,975 A | * | 6/1992 | Dahnert ....................... 312/201 |
| 5,363,940 A | * | 11/1994 | Fahrion ...................... 182/62.5 |
| 5,423,396 A | * | 6/1995 | Fahrion ......................... 182/36 |
| 6,145,619 A | * | 11/2000 | Risser ........................ 182/113 |
| 6,772,860 B1 | * | 8/2004 | Nelson ........................ 182/115 |
| 7,194,358 B2 | * | 3/2007 | Callaghan et al. ........... 701/301 |
| 2004/0006930 A1 | * | 1/2004 | Fahrion ........................... 52/64 |

* cited by examiner

*Primary Examiner*—Alvin C Chin-Shue
(74) *Attorney, Agent, or Firm*—John B. Hardaway, III; Daniel Charles Leonardi; Nexsen Pruet, LLC

(57) ABSTRACT

A flatbed servicing station provides a mobile elevated workers platform with an elongated deck. The platform is selectively moved toward and away from a flatbed and has safety features for stopping movement of the platform toward the flatbed when a foreign object is detected between the platform and the flatbed. A plurality of side-by-side safety gates are provided on the side of the deck adjacent the flatbed and a guard gate is provided which is positionable across the rear of the flatbed. Safety apparatus is provided to prevent injury of personnel disposed between a platform and a flatbed being serviced.

14 Claims, 5 Drawing Sheets

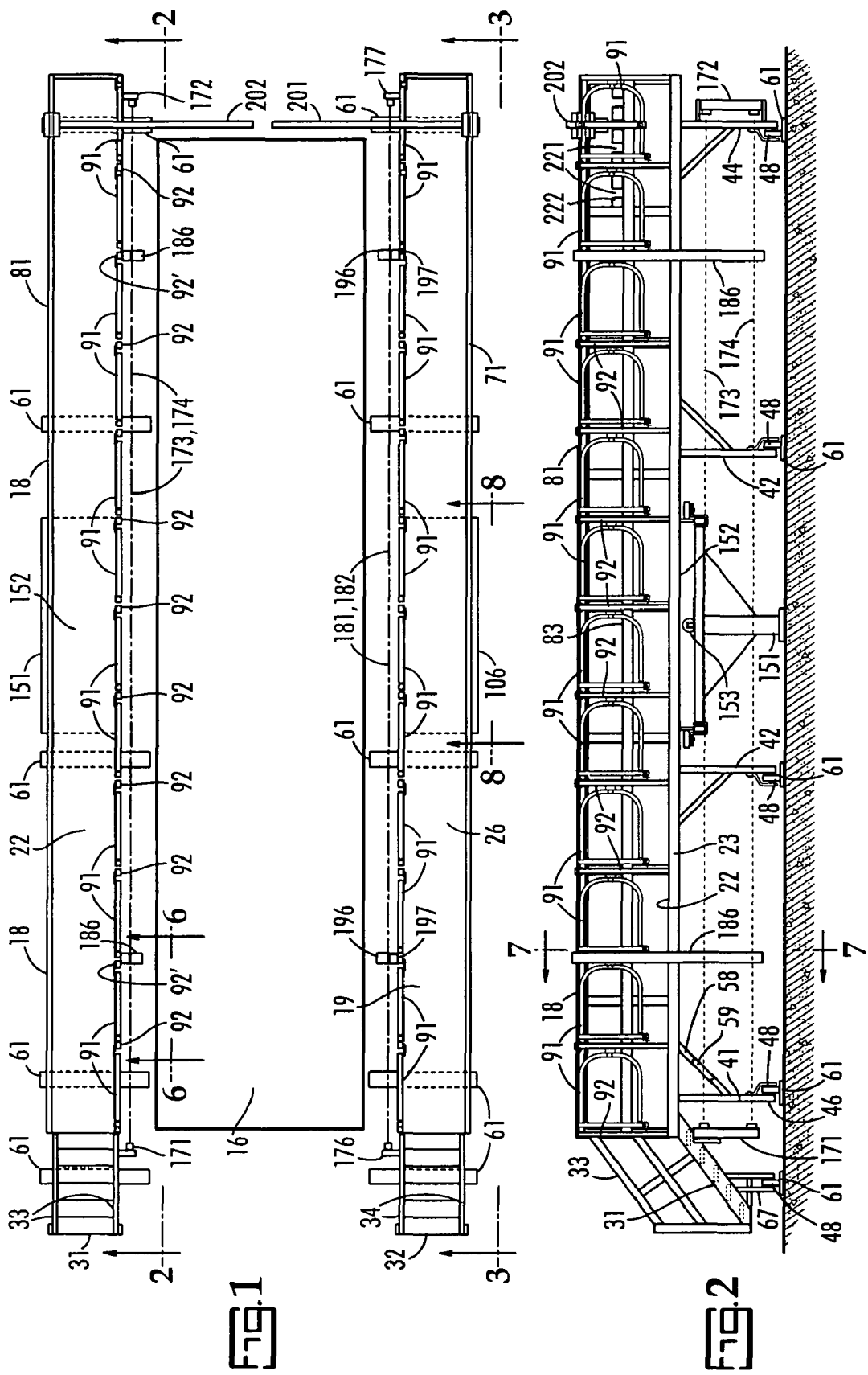

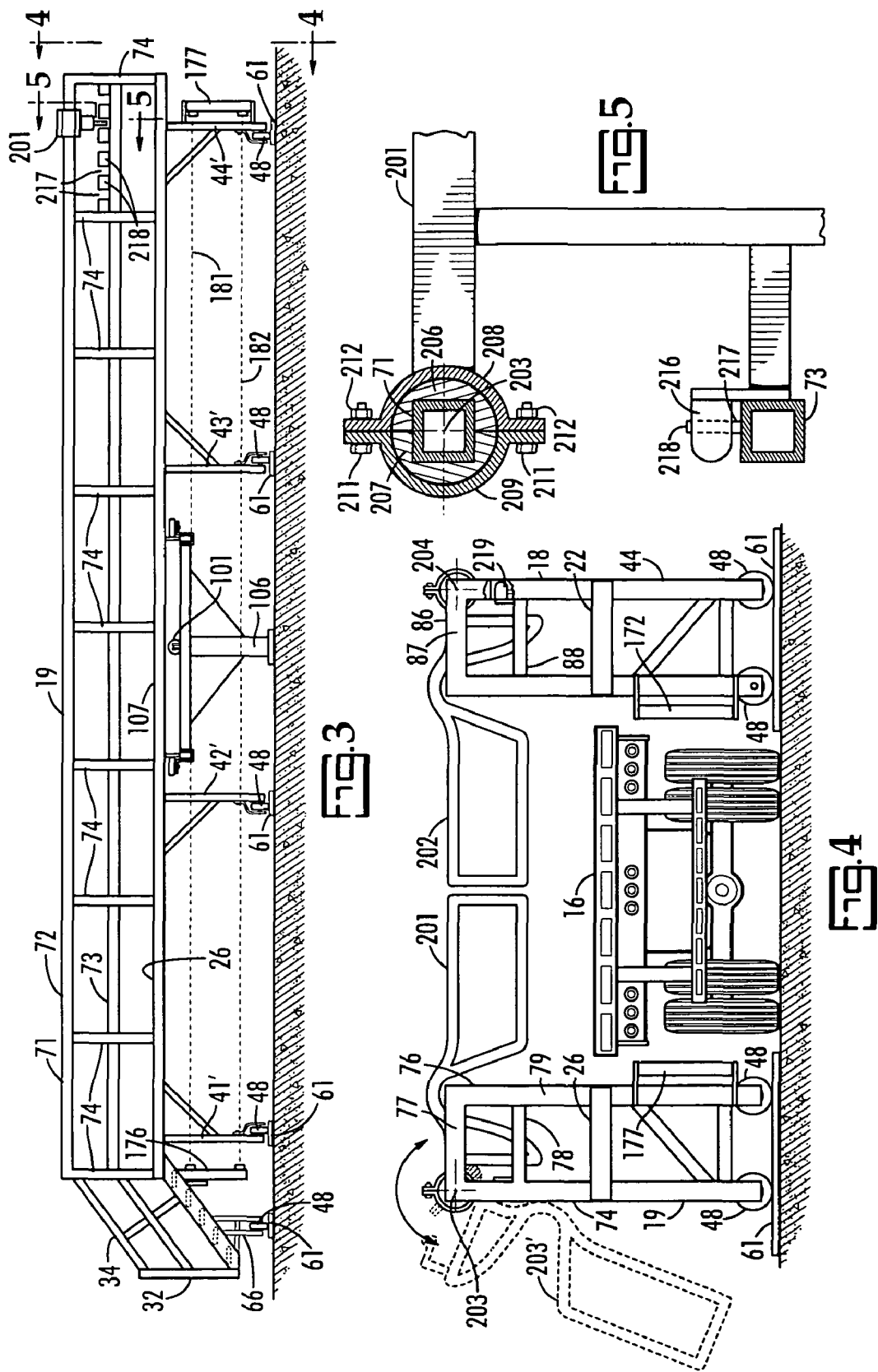

ACCESS PLATFORM FOR FLATBEDS

BACKGROUND OF THE INVENTION

A workers platform is needed for servicing flatbed trucks and flatbed trailers commonly referred to as flatbeds. The servicing activity may include loading, unloading, tarping or untarping a load or inspection. A stationary workers platform has a disadvantage in that the space between the platform and a flatbed positioned alongside is often excessive which makes servicing more difficult and may impair the safety of the workers.

SUMMARY OF THE INVENTION

A mobile elongated workers platform is provided that is shiftable lateral toward and away from a flatbed positioned alongside. Laterally shifting of the platform is effected by a power operated linear actuator. A foreign object detection apparatus is provided to halt movement of the platform toward the flatbed if an object, such as a person, is detected between the platform and the flatbed. The detection apparatus also stops movement of the platform to prevent it from contacting the flatbed. A plurality of side-by-side safety gates are provided along the side of the platform next to the flatbed and a pair of guard gates are provided that can be pivoted to a position across the rear end of the flatbed.

BRIEF DESCRIPTION OF THE DRAWINGS

The invention is illustrated in the accompanying drawings, in which:

FIG. 1 is a top view of a pair of laterally shiftable worker platforms and a flatbed positioned there between;

FIG. 2 is a view taken on the line 2-2 in FIG. 1;

FIG. 3 is a side view taken on the line 3-3 in FIG. 1;

FIG. 4 is a view taken on the line 4-4 in FIG. 3;

FIG. 5 is a section taken on line 5-5 in FIG. 3;

DETAILED DESCRIPTION OF THE INVENTION

Figure 6:
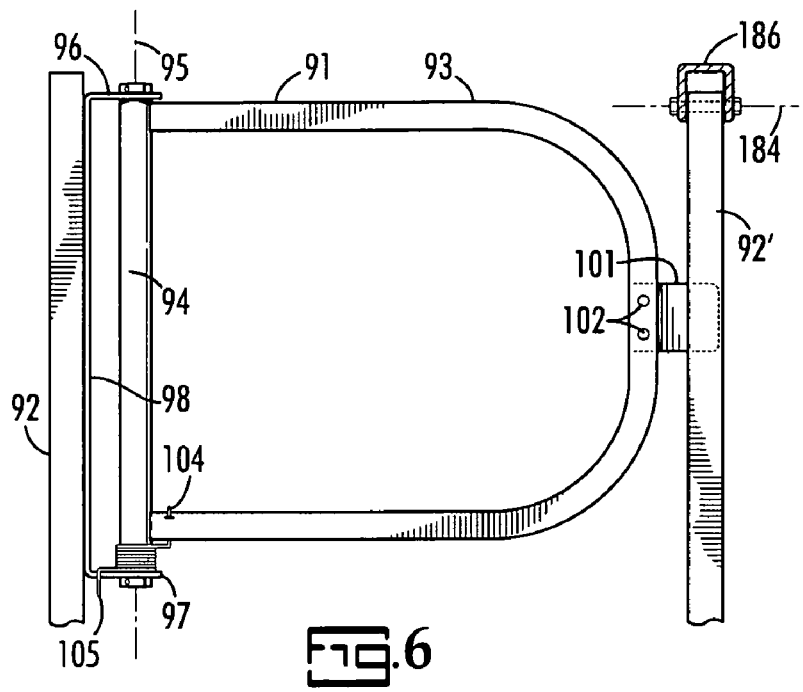
FIG. 6 is a side view of a safety gate taken on line 6-6 in FIG. 1 with parts broken away for illustration purposes.

FIG. 1 shows a top view of a flatbed or semi trailer 16 positioned between a right side elongated elevated workers platform 18 and a left side elongated elevated workers platform 19. The right side platform 18 has an elongated horizontal rectangular deck 22 which is slightly longer than the standard length semi trailer 16 positioned in juxtaposed parallel relation to its laterally inward side 23. The elevated left side platform 19 likewise has an elongated horizontal rectangular deck 26 of the same length as the deck 22 of the right platform 18. The laterally inner side 27 of the deck 26 is in juxtaposed parallel relation to the left side of the flatbed trailer 16.

As shown in FIGS. 1, 2 and 3, a staircase 31 is rigidly secured to the forward or front end of the deck 22 and a staircase 32 is rigidly secured to the forward or front end of the deck 26. The staircases 31, 32, which have hand rails 33, 34, respectively, provide quick and safe worker access to the decks 22, 26 of the platforms 18, 19.

Figure 7:
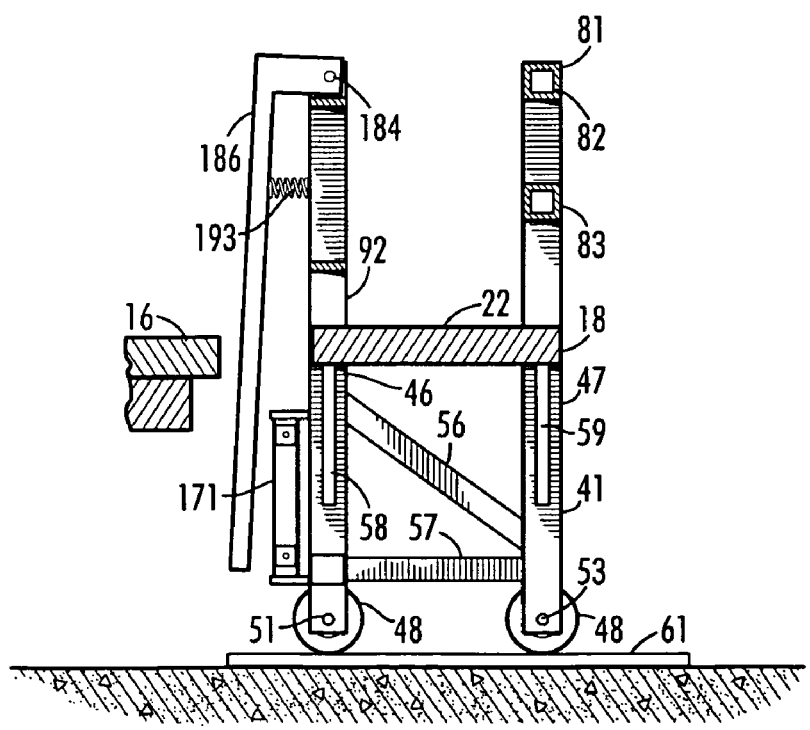
FIG. 7 is a view taken on line 7-7 in FIG. 2.

As shown in FIGS. 2 and 7, the deck 22 of the platform 18 is supported by four longitudinally spaced support structures 41, 42, 43, 44. As shown in FIG. 7, the support structure 41 includes a pair of vertical posts 46, 47 rigidly secured to the underside of the deck 22 and having wheels 48 rotatably mounted on their lower ends for rotation about laterally spaced horizontal parallel axes 51, 52 extending in the longitudinal direction of the platform 18. The posts 46, 47 are braced by a diagonal brace 56 and a horizontal brace 57 near the wheels 48. As shown in FIG. 2, posts 46, 47 are also braced by diagonal braces 58, 59, respectfully, extending between and rigidly secured to the posts 46, 47 and the deck 22. The other support structures 42, 43, 44 are built in a manner similar to or the same as that described regarding support structure 41 with wheels 48 on their lower ends. The wheels 48 run on a flat running surface support, which may be provided by a flat concrete surface 62 or by the flat laterally extending rigid runners 61 shown in FIGS. 1, 2, 3, 4 and 7. As shown in FIG. 3 the stairway 32 is additionally supported by at least one wheel 48 rotatably mounted on a bracket 66 rigidly secured to the underside of the staircase 32. In a similar manner the stairway 31 has a wheel 48 rotatably support on a bracket 67. The workers platform 19 is a reverse image of the workers platform 18 and is provided with support structures 41', 42', 43' and 44' as shown in FIG. 3.

As shown in FIGS. 1 and 3, an upstanding guard railing or guard rail 71 is provided at the laterally outer side of the deck 26 of the workers platform 19. The guard rail 71 includes a top horizontal rail 72 and a lower or middle rail 73 which run the longitudinal length of the deck 22. The rails 72, 73 are supported on vertical uprights or posts 74 rigidly secured to the deck 26. As shown in FIG. 4, an upstanding guard railing or guard rail 76 is provided at the rear end of the deck 26, which includes a top rail 77 and a bottom rail 78 attached to a post 74 and a corner post 79.

As shown in FIGS. 1, 2 and 7, the workers platform 18 is provided with an upstanding guard railing or guardrail 81 along the laterally outer side of the deck 22 which includes a horizontal top rail 82 and a lower horizontal rail 83. As shown in FIGS. 1 and 4, an upstanding guard railing or guard rail 86 is provided at the rear end of the deck 22 which includes a top rail 87 and a bottom rail 88.

As shown in FIGS. 1 and 2, the laterally inner side of the deck 22 of the workers platform 18 is provided with side by side safety gates 91 pivotally mounted to posts 92, 92'. Referring also to FIG. 6, the gate 91 includes s U-shaped component 93 whose ends are welded to a vertical tie 94 which is pivotally connected on a vertical axis 95 to vertically spaced legs 96, 97 of a bracket 98 rigidly secured to a post 92. An abutment plate 101 is secured by fasteners 102 to the U-shaped component 93 and a coil spring 103, whose opposite ends 104 and 105 are connected to the gate 91 and the bracket 98, biases the gate 91 to the closed position shown in FIG. 6, in which the abutment plate 101 abuts a post 92'. The gates 91 on the laterally inner side of the deck 26 of the workers platform 19 are constructed and installed in a similar manner. Thus the gates 91 on both platforms 18, 19 must be opened inwardly, away from the flatbed 16, rather than outwardly toward the flatbed 16.

Figure 8:
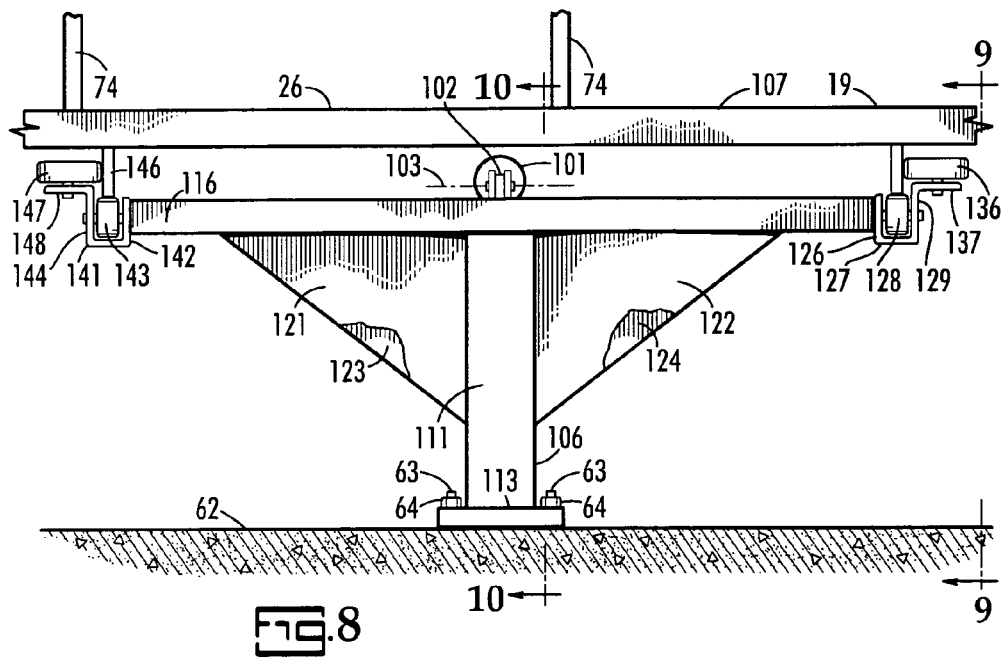
FIG. 8 is a view taken on the line 8-8 in FIG. 1 with parts broken away for illustration purposes.
Figure 9:
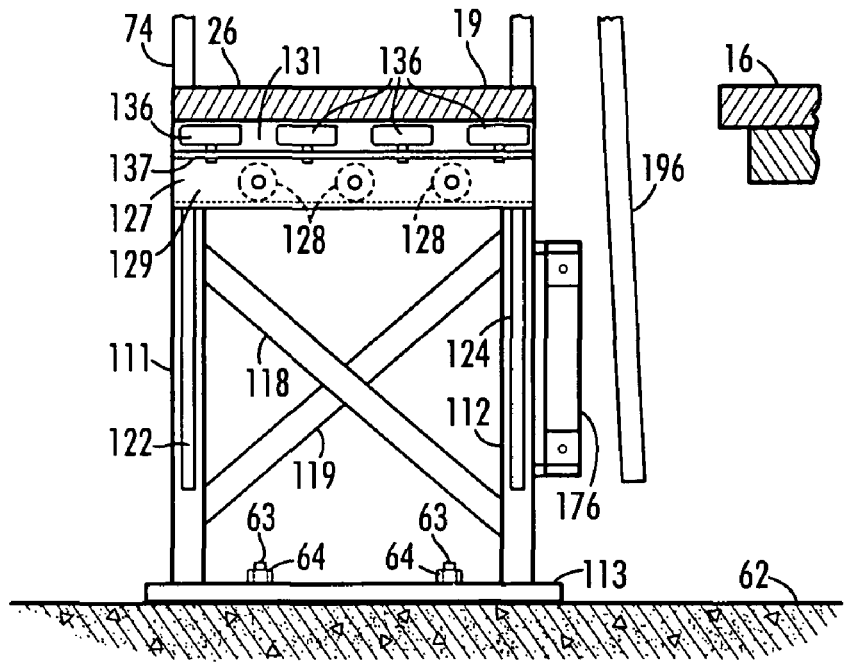
FIG. 9 is a section taken on line 9-9 in FIG. 8.
Figure 10:
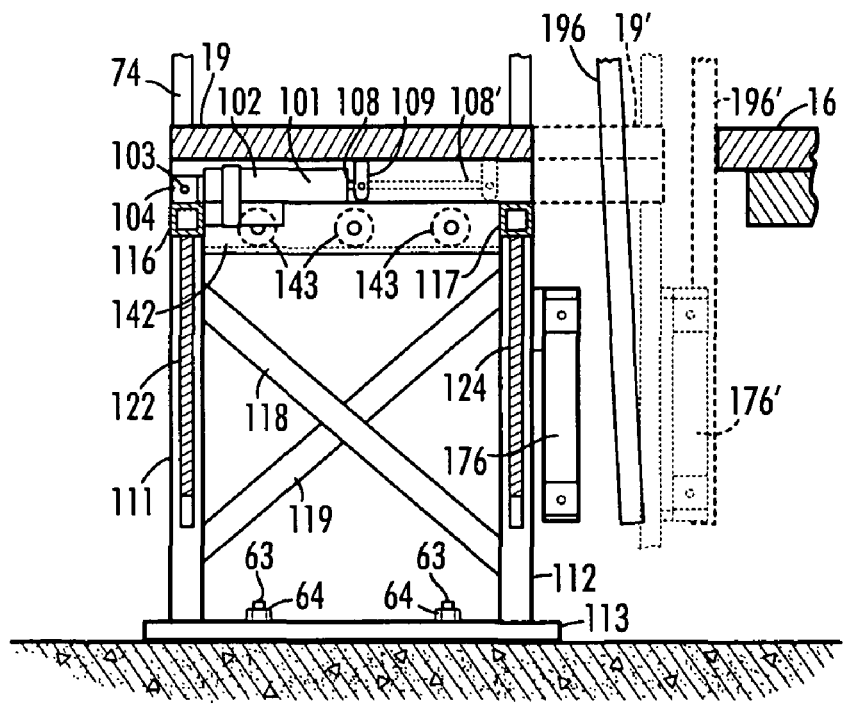
FIG. 10 is a section taken on line 10-10 in FIG. 8.

As shown in FIGS. 3, 8, 9 and 10, an electrically powered linear actuator 101 has its housing 102 pivotally connected on a horizontal axis 103 to a pair of upstanding brackets 104, welded to a stationary actuator support 106 disposed beneath a central part 107 of the deck 26. The actuator 101 has an extensible member 108 whose distal end is pivotally connected to a bracket 109 rigidly secured to the underside of the deck 26. The support 106 includes a pair of legs 111, 112 welded at their bottoms to a base plate 113 rigidly secured to the flat concrete floor 62 by anchor bolts 63 and nuts 64. A pair of parallel horizontal beams 116, 117 are welded at the underside of their mid section to the top of the legs 111, 112, respectively, so as to extend in the longitudinal direction of the deck 26. The legs 111, 112 are reinforced by cross braces 118, 119 rigidly interconnected there between. As shown in FIGS. 8, 9 and 10, triangular braces 121, 122 are welded to the leg 111 and to the beam 116 and triangular braces 123, 124 are welded to the leg 112 and to the beam 117. As shown in FIG. 8, a vertical flange 126 of a channel 127 is welded to corresponding rearward ends of the beams 116, 117. Three rollers 128 are rotatably supported on horizontal axes by the flange 126 and a flange 129 of the channel 127. The rollers 128 are in supporting relation to the bottom of a laterally extending stringer 131 secured to and extending downward from the underside of the deck 26. Four rollers 136 are rotatably supported on parallel vertical axes by a bracket 137 secured to and extending horizontally from the upper end of the flange 129. The rollers 136 are in confronting or guiding relation to a vertical side of the laterally extending stringer 131. In a like manner an upwardly open and horizontally disposed channel 141 has a flange 142 welded to the forward ends of the beams 116, 117 and three rollers 143 are rotatably mounted on the flange 142 and a flange 144 so as to be in supporting relation to a laterally extending stringer 146 secured to the underside of the deck 26. A plurality of guide rollers 147, only one of which is shown in FIG. 8, are rotatably mounted on laterally spaced vertical axes to a bracket 148 secured to and extending forward from the top of the flange 144. The guide rollers 136, 147 in cooperation with the stringers or guide rails 131, 146 guide the laterally movement of the workers platform 19. The linear actuator 101 is operable to extend its extensible member 108 to the position shown by broken lines 108' in FIG. 10, in which the workers platform 19 has been shifted laterally to a position shown by broken lines 19' in which it is relatively close to the flatbed 16. An actuator support 151, which is a reverse image of actuator support 106, is installed beneath the central section 152 of the deck 22 of the workers platform 18 and its linear actuator 153 is selectively operable to shift the platform 18 laterally toward and away from the flatbed 16.

A photo-electric safety system is provided for each of the workers platforms 18, 19. The photo-electric system for platform 18 includes a sender or emitter 171 mounted on the staircase 31 sending upper and lower parallel light beams 173, 174 to a receiver 172 mounted on the platform support structure 44 as shown in FIGS. 1 and 4. The photo-electric system for the workers platform 19 includes a sender or emitter 176 mounted on the staircase 32 transmitting light beams 181, 182 to a receiver 177 mounted on the support structure 44'. When any one of the beams 173, 174, 181, 182 is interrupted or broken by the presence of an obstacle, such as a human, the power to the linear actuator is interrupted by the photo-electric receiver 172 or 177 causing a safety switch to be opened thereby disrupting the flow of electrical power to the drive motor of the associated electrical driven linear actuator 101 or 166.

Figure 11:
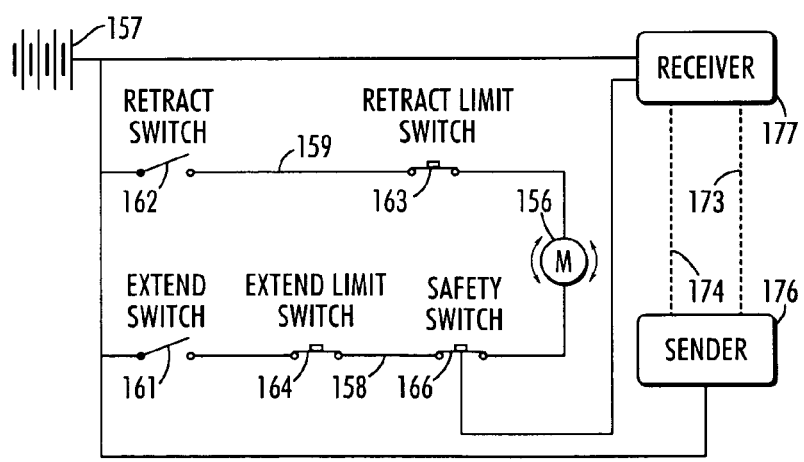
FIG. 11 is a schematic showing a control system for a linear actuator including a photo-electric safety sensor.

FIG. 11 schematically illustrates a control system for a reversible electric motor 156 of the linear actuator 101 connected to a power source 157 by circuitry including a pair of leads 158, 159 with an extend switch 161 and a retract switch 162, respectively, by which the reversible electric motor 156 may be selectively driven to extend and retract the extensible member 108, thereby causing corresponding lateral movement of the workers platform 19. The electric motor 156 is disposed within the actuator housing 102. The actuator 101 has a built in retract limit switch 163 and a built in extend limit switch 164 which automatically open to interrupt power to the motor 156 at opposite ends, respectively, of the linear stroke of the extensible member 108. A solenoid operated safety switch 166 in the extend lead 158 is opened by the receiver 177 of the left side photo-electric safety system through a lead 178 when either of the light beams 181, 182 is broken. A control system similar to that shown in FIG. 11 is provided for the linear actuator 153 and the photo-electric sender 171 and receiver 172 of the right side workers platform 18.

As shown in FIGS. 2 and 7, a pair of safety pendants 186 are pivotally connected at their upper ends to the upper ends of posts 92' on a horizontal axis 184 extending in the direction of elongation of the deck 22. The pendant 186 is biased laterally away from the deck 22 by a spring 193 to a pivotal position in which it lies between the flatbed 16 and the light beams extending between the electric eye sender 171 and the electric eye receiver 172 of the photo-electric safety system. In a similar manner a pair of pendants 196 have their upper ends pivotally connected to the upper ends of posts 197 on the workers platform 19 for pivotal movement about a longitudinally extending horizontal axis. As shown in FIGS. 9 and 10, if the flatbed 16 is positioned sufficiently close to the workers platform 19, when it is in its servicing position between the workers platforms 18, 19, and linear actuator 101 is actuated to move the workers platform 19 toward the flatbed as indicated by lines 19' in FIG. 10, the pendant 196 will contact the flatbed 16 causing it to pivot to the position shown by broken lines 196' in which it interrupts one or both the light beams 181, 182 between the sender 176 and the receiver 177 thereby stopping extension of the linear actuator 101. Thus the pendants 186, 196 function to prevent the workers platforms 18, 19 from being extended laterally against the flatbed 16.

After the flatbed 16 is moved to its servicing position as shown in FIG. 1, and the workers platforms have been shifted laterally toward the flatbed as shown in FIG. 4, a pair of guard gates 201, 202 can be rotated about parallel longitudinally extending horizontal axes 203, 204 to their closed position, shown in FIG. 4, in which they extend above and across the rear end of the flatbed 16; thereby affording protection for workers present on the flatbed 116. The broken lines 203' show the open position for the gate 203 and the gate 204 may be rotated about the axis 204 to a similar open position, wherein it is disposed at the laterally outer side of the workers platform 18. As shown in FIG. 5, a pivot connection is formed between the gate 201 and a pair of split bearing components 206, 207 having interiors configured to fit the guard rail 71 and cylindrically configured exterior surfaces pivotally supporting a split bearing bracket made up of a semi cylindrical member 208 welded to the gate 201 and a semi cylindrical part which is secured to the member 208 by bolts 211 and nuts 212. The gate 201 can be slid longitudinally along the guard rail 71 to reposition the gate 201 in a fore and aft direction. When the gate 201 is pivoted upwardly from the closed position shown in FIG. 5, so that the keeper 216 is not engaged in any of the plurality of slots 217 in a rack 218 provided on the rail 73, the gate may be shifted in a fore and aft direction to a new position to match deviations in the position of the rear end of the flatbed 16. The gate 202 is connected to the rail 81 of the workers platform 18 in a similar manner and is also horizontally repositionable in a fore and aft direction. The gate 202 has a keeper 219 similar to keeper 216 which can be inserted in one of the notches or slots 221 in a rack 222 secured to rail 83, as shown in FIG. 2.

The herein disclosed flatbed servicing station facilitates fast safe servicing of flatbeds. The driver of the truck having or towing the flatbed need only steer the vehicle in a straight direction parallel to the platforms. The platforms can then be moved by the powered linear actuators to working positions adjacent to the flatbed. The safety system prevents injury in event a worker is between the flatbed and a platform when it is advanced toward the flatbed and also prevents the platforms from being impacted against the flatbed.

What is claimed is:

1. A servicing station for a flatbed, comprising:
   an elongated elevated workers platform having
      a horizontally disposed longitudinal deck with first and second longitudinally opposite ends, a central part and laterally opposite sides, one of said sides being adapted for positioning in juxtaposed relation to said flatbed,
      a plurality of longitudinally spaced support structures secured to and extending downwardly from said deck to lower ends,
      wheels on said lower ends of said support structures facilitating lateral movement of said platform, and
      an access stairway secured to said first longitudinal end of said deck,
   a horizontal running surface support for said wheels,
   a stationary actuator support beneath said central part of said deck,
   a powered extensible and contractible linear actuator interconnected between said actuator support and said central part, said actuator being operative to move said platform laterally, and
   a control system for said actuator for selectively effecting linear extension and contraction of said actuator, and a pair of parallel guide rails secured and extending laterally across the underside of said deck and rollers rotatably mounted on said actuator support in guiding relation to said guide rails.

2. The vehicle servicing station of claim 1 having a first upstanding guard railing at the lateral side of said deck opposite said one side and a plurality of upstanding side-by-side safety gates along said one side of said deck, said gates being mounted on said deck for swinging movement about vertical axes toward said first guard railing.

3. The servicing station of claim 2 having a second upstanding guard railing at said second longitudinal end of said deck.

4. The servicing station of claim 2 having a guard gate at said second end of said deck pivotable about a longitudinally disposed horizontal axis between a guard position in which it is positioned across the rear of said flatbed positioned alongside said platform and a second position in which it does not extend laterally beyond said one side of said deck.

5. The servicing station of claim 1 having support wheels on said access stairway engaging said running surface support.

6. The servicing station of claim 1 wherein said control system for said actuator includes an electrical circuit for selectively causing extension and contraction of said actuator to advance said deck toward said flatbed and to retract said deck from said flatbed, respectively, and further comprising a photoelectric apparatus including an emitter mounted on said platform near one of said longitudinal ends of said deck and a receiver mounted on said platform near the other of said longitudinal ends of said deck, said emitter and receiver being disposed on said one lateral side of said deck for detecting the presence of a foreign object between said deck and said flatbed and said electrical circuit having a safety switch which is actuated by said photoelectric apparatus to stop extension of said actuator when a foreign object is detected between said deck and said flatbed by said photoelectric apparatus.

7. The servicing station of claim 6 having a spring biased safety pendant pivotally connected to said platform and extending downwardly between said deck and said flatbed, said safety pendant blocking transmission of photoelectric signals between said emitter and said receiver when said workers platform is a predetermined distance from said flatbed thereby causing actuation of said safety switch to stop movement of said platform.

8. A flatbed servicing station comprising:
   first and second elongated elevated workers platforms in laterally spaced parallel relation to one another and each having
      a longitudinally disposed horizontal deck with first and second longitudinally opposite ends, a central part and laterally opposite sides, one of said sides being in juxtaposed relation to said flatbed,
      a plurality of longitudinally spaced support structures secured to and extending downwardly from said deck to lower ends,
      wheels on said lower ends of said support structures facilitating lateral movement of said platform, and
      an access stairway secured to said first longitudinal end of said deck,
   a stationary actuator support beneath said central part of each of said decks,
   a powered extensible and contractible linear actuator interconnected between each of said actuator supports and said central part of the associated platform, said actuators being selectively operative to move said platforms laterally, and
   a control for said actuators for selectively effecting linear extension and contraction of each of said actuators, and a pair of parallel guide rails secured and extending laterally across the underside of each of said decks and rollers rotatably mounted on said actuator supports in guiding relation to said guide rails.

9. The flatbed servicing station of claim 8 wherein each of said platforms has a first upstanding guard railing at the side of its deck opposite said one side, and a plurality of upstanding side-by-side safety gates along said one side of its deck, said gates being pivotably mounted on longitudinally spaced vertical axes for gate opening swinging movement toward said first guard railing.

10. The servicing station of claim 9 having a guard gate at said second end of each of said decks pivotable about a longitudinally disposed horizontal axis between a guard position in which it is positioned across the rear of said flatbed positioned alongside said platform and a second position in which it does not extend laterally beyond said one side of the associated deck.

11. The servicing station of claim 8 wherein said control system for said actuators includes electrical circuits for selectively causing said actuators to advance said decks toward said flatbed and photoelectric apparatus including an emitter and a receiver mounted on longitudinally opposite ends, respectively, of said platforms, said emitters and receivers being positioned to detect the presence of foreign objects between flatbed and said decks and each of said electrical circuits having a safety switch which is actuated by the associated photoelectric apparatus to stop extension of the associated actuator when a foreign object is detected between said flatbed and the associated deck.

12. The servicing station of claim 11 having a spring biased safety pendant pivotally connected to each of said platforms and extending downwardly between said platform and said flatbed, said safety pendant blocking transmission of photoelectric signals between said emitter and said receiver mounted on the associated platform when said associated platform is a predetermined distance from said flatbed, thereby causing actuation of said safety switch to stop movement of the associated platform.

13. A flatbed servicing station comprising:
first and second elongated elevated workers platforms in laterally spaced parallel relation to one another and each having
   a longitudinally disposed horizontal deck with first and second longitudinally opposite ends, a central part and laterally opposite sides, one of said sides being in juxtaposed relation to said flatbed,
   a plurality of longitudinally spaced support structures secured to and extending downwardly from said deck to lower ends,
   wheels on said lower ends of said support structures facilitating lateral movement of said platform, and
   an access stairway secured to said first longitudinal end of said deck,
   a stationary actuator support beneath said central part of each of said decks,
   a powered extensible and contractible linear actuator interconnected between each of said actuator supports and said central part of the associated platform, said actuators being selectively operative to move said platforms laterally, and
   a control for said actuators for selectively effecting linear extension and contraction of each of said actuators.

14. The flatbed servicing station of claim 13 wherein each of said platforms has a first upstanding guard railing at the side of its deck opposite said one side, and a plurality of upstanding side-by-side safety gates along said one side of its deck, said gates being pivotably mounted on longitudinally spaced vertical axes for gate opening swinging movement toward said first guard railing.

* * * * *

Disclaimer

7,832,525 B2 — Ronald W. Bennett, Florence, SC (US); Ellie H. MacDonald, Timmonsville, SC (US); and James A. Ackerman, Mullins, SC (US). ACCESS PLATFORM FOR FLATBEDS. Patent dated Nov. 16, 2010. Disclaimer filed August 29, 2012, by the assignee, Aluminum Ladder Company.

Hereby disclaims the following complete claims 13 and 14 of said patent.

*(Official Gazette, November 12, 2013)*